United States Patent
Jansson

(10) Patent No.: US 6,732,810 B1
(45) Date of Patent: May 11, 2004

(54) DETECTOR SYSTEM FOR DETECTING GLOWING PARTICLES

(75) Inventor: Lennart Carl Erik Jansson, Stockholm (SE)

(73) Assignee: Firefly AB, Stockholm (SE)

( * ) Notice: Subject to any disclaimer, the term of this patent is extended or adjusted under 35 U.S.C. 154(b) by 0 days.

(21) Appl. No.: 09/869,353

(22) PCT Filed: Dec. 27, 1999

(86) PCT No.: PCT/SE99/02486

§ 371 (c)(1),
(2), (4) Date: Sep. 5, 2001

(87) PCT Pub. No.: WO00/39769

PCT Pub. Date: Jul. 6, 2000

(30) Foreign Application Priority Data

Dec. 29, 1998 (SE) .............................................. 9804579

(51) Int. Cl.[7] .............................................. A62C 37/10
(52) U.S. Cl. .............................. 169/61; 169/16; 169/54; 169/60; 340/578; 340/584
(58) Field of Search .............................. 169/5, 16, 54, 169/56, 60, 61; 340/577, 578, 584

(56) References Cited

U.S. PATENT DOCUMENTS

| | | | | |
|---|---|---|---|---|
| 3,824,392 A | * | 7/1974 | Tibbling ..................... | 340/578 |
| 3,909,954 A | * | 10/1975 | Zoukourian .................. | 169/61 |
| 3,990,518 A | * | 11/1976 | Hemme ........................ | 169/60 |
| 4,027,302 A | * | 5/1977 | Healey et al. ................ | 169/61 |
| 4,142,417 A | | 3/1979 | Cashdollar et al. | |
| 4,262,286 A | * | 4/1981 | Tanigawa .................... | 340/584 |
| 5,740,867 A | * | 4/1998 | Jansson ....................... | 169/60 |
| 5,749,420 A | | 5/1998 | Jansson | |
| 5,936,531 A | * | 8/1999 | Powers ........................ | 169/61 |

FOREIGN PATENT DOCUMENTS

| | | |
|---|---|---|
| GB | 2 027 883 | 2/1980 |
| GB | 2 325 051 | 11/1998 |

* cited by examiner

Primary Examiner—Steven J. Ganey
(74) Attorney, Agent, or Firm—Dykema Gossett PLLC

(57) ABSTRACT

The present invention relates to a detector arrangement inlcuded in a preventative, protective system. The sensor lobes of at least two sensor units or sensor sections are arranged to cover the cross-sectional area of a tubular transport device. The arrangement includes a unit for evaluating the output signals of the sensor units, and an activation unit which is adapted to evaluate sensed sub-intensities relating to wavelength ranges and each deriving from said sensor units and to thus coordinate received wavelength-related and sub-intensity-dependent signals for calculating and establishing therefrom the relevant disposition of the particle to initiate fire and/or explosion or some other danger.

19 Claims, 3 Drawing Sheets

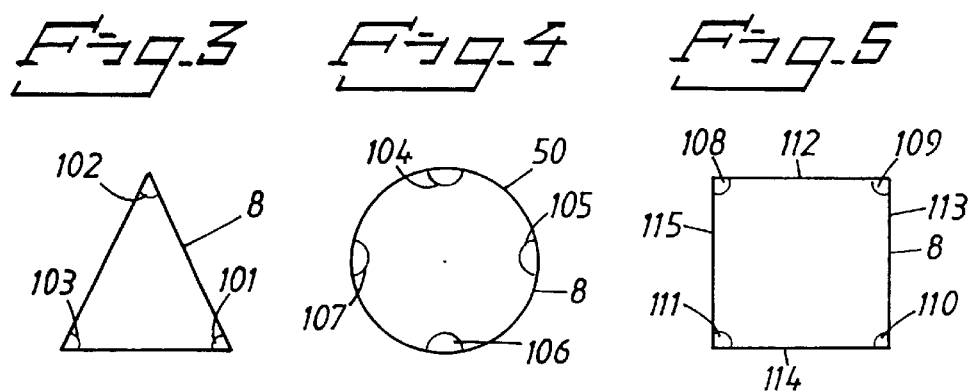
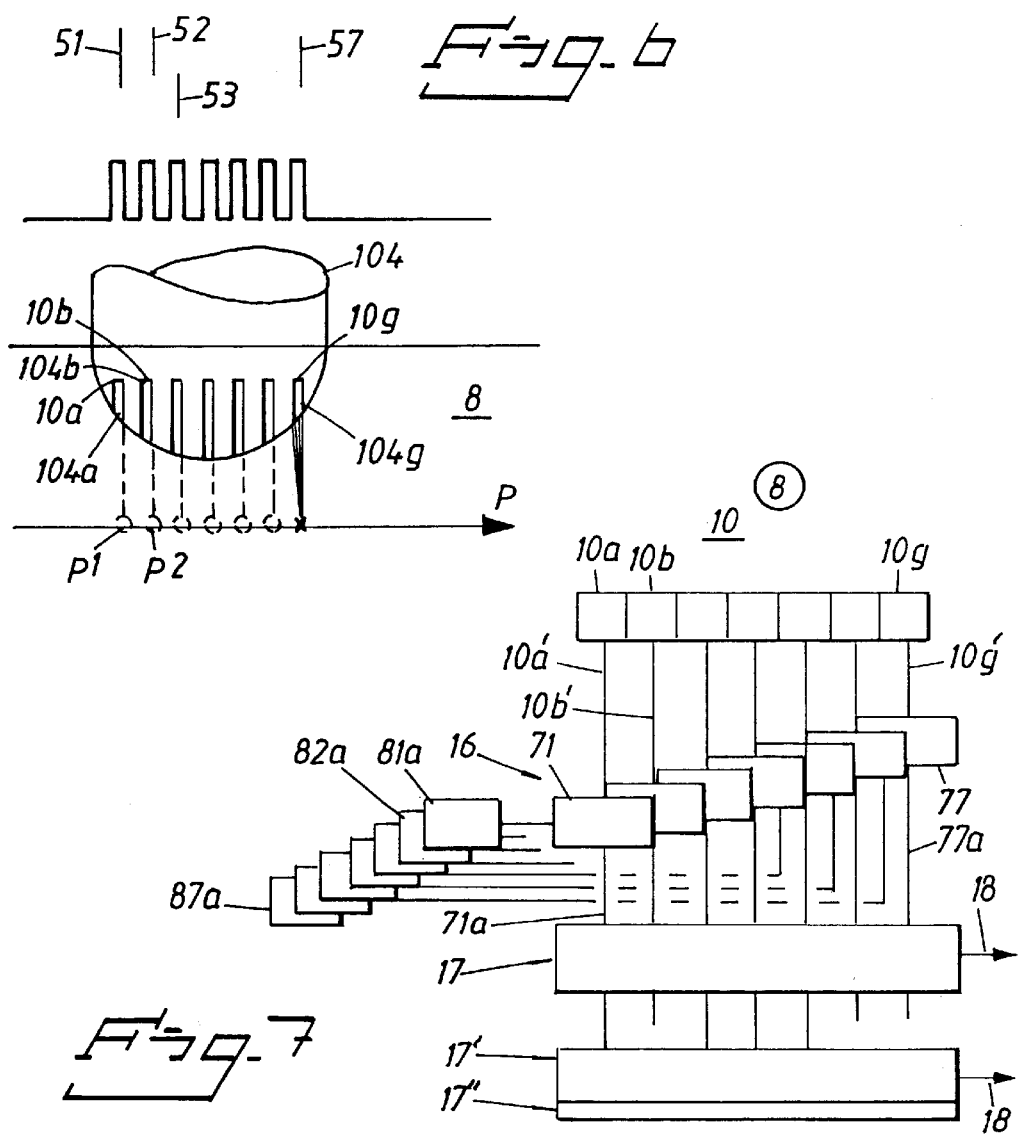

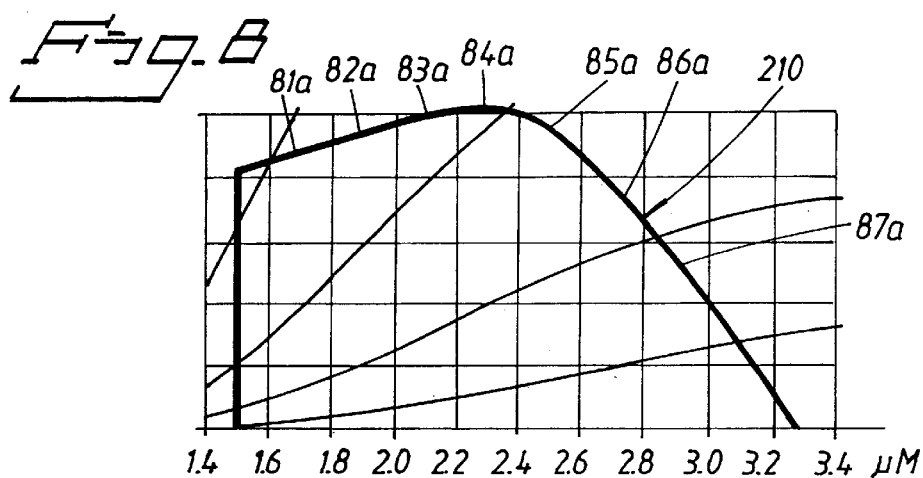
Fig. 8
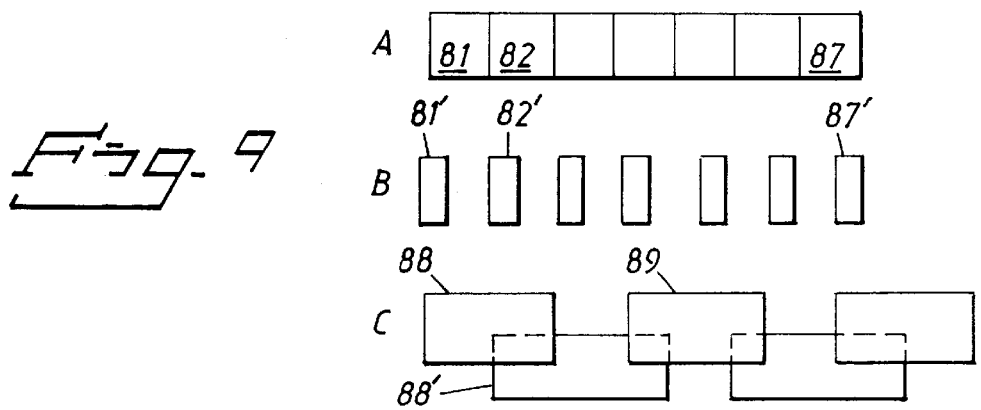
Fig. 9
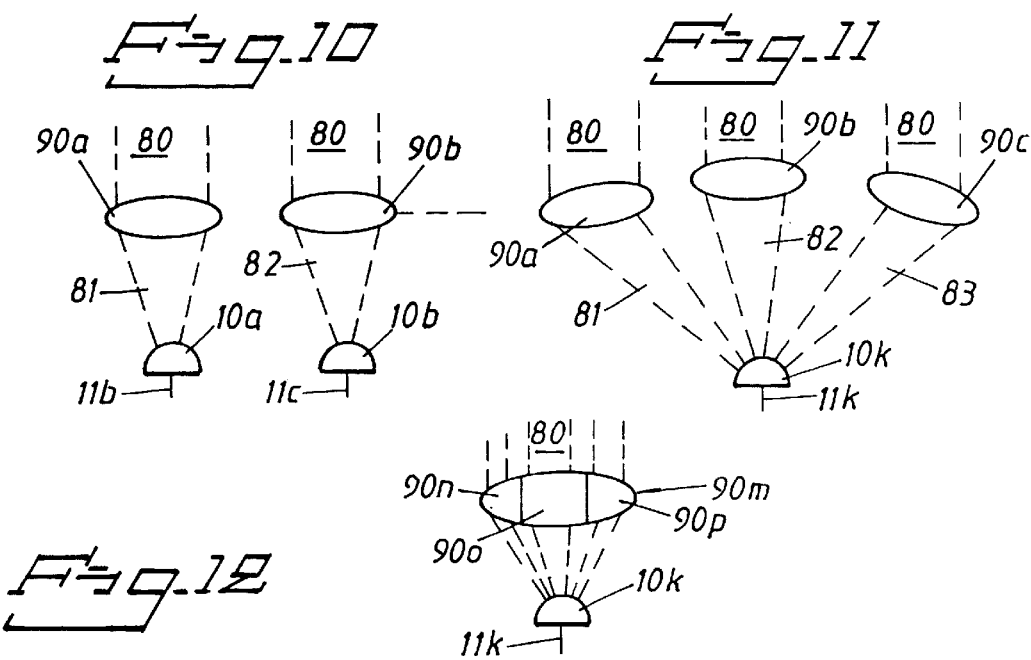
Fig. 10
Fig. 11
Fig. 12

DETECTOR SYSTEM FOR DETECTING GLOWING PARTICLES

FIELD OF INVENTION

The present invention relates generally to a detector arrangement and more specifically to a detector arrangement which is designed to detect in a stream of loose material the presence of one or more individual particles that has/have a temperature and/or an energy content such as to be able to incite fire or cause an explosion to take place in a downstream particle or material collecting risk zone.

By loose material is meant any type of material that can be transported by or in a gas mixture, normally air, wherewith the individual particles of the loose material are normally spaced from one another.

Loose material of this kind may consist of very fine particles in the nature of dust, or may consist of powder particles or granular particles. Wood chips, pellets, straw and like materials can also be transported in this way.

The inventive detector arrangement is adapted to be included in a preventative, protective system that includes one or more sensor units, an evaluation unit evaluating the output signals of said sensor units, and an activation unit connected to said evaluation unit, wherein at least one individual particle that can be sensed by the sensor units and having an energy content determined in the evaluation unit as exceeding a predetermined value will cause the activation unit to switch from a first state (a rest state) to a second state (an activating state).

More particularly, the detector arrangement can be adapted for use in a process in which loose, process material is produced in a first unit and transported therefrom to a receiving, second unit, wherein treatment of said material in said first unit may result in one or more particles being heated to a temperature that is sufficiently high to initiate fire and/or an explosion in at least the second unit, and in which arrangement the transport system required to transport the loose material between said first unit and said second unit includes a stabilising zone or disturbance zone, a zone that indicates the presence of high temperature particles, an effectuating zone, an extinguishing zone, and a downstream risk zone adjacent to or within said second unit.

The stabilisation zone is intended to allow particles that have a low energy content and do not constitute a fire risk or explosion risk within the downstream located zones, and particularly within the risk zone, to reduce their energy content and therewith prevent said particles being indicated as a hazard within the immediate downstream indication zone.

The indication zone includes one or more sensor units which function to indicate the presence of one or more individual particles whose energy content is liable to incite fire or some other damage should said particle or particles appear in the downstream zones and then particularly in the risk zone.

Each of the aforesaid sensor units can co-act with a unit which evaluates the output signals of a sensor unit, and with an activation unit such that when the sensor units indicate the presence of such a hazardous particle, the activation unit will activate an extinguishing means associated with said extinguishing zone and/or a particle removal means.

The indication zone is followed by an effectuating zone whose length is adapted so that upon activation of means in said extinguishing zone said means will have time to generate an extinguishing barrier before or as the particle reaches said zone.

The extinguishing zone may also include a valve, which deflects a collection of material containing said particle from the transportation path to the risk zone.

DESCRIPTION OF THE BACKGROUND ART

A preventative, protective system that includes one or more sensor units and associated detector arrangements of the aforedescribed kind is previously known and marketed by Firefly AB, Stockholm, Sweden. The preventative, protective system functions to indicate sparks and individual, glowing particles in a stream of loose material, such as granular material or dust, and to apply extinguishing means or smothering means so as to prevent such glowing particles from reaching the downstream process unit, such as a filter, a silo or the like, or from reaching the risk zone, which would otherwise be set on fire and/or caused to explode.

The preventative, protective system utilises in operation various detector systems and detector arrangements for sensing and detecting individual particles.

With regard to sensor units included in detector arrangements of the aforesaid kind and similar preventative applications, it has been found that they have a delayed reaction in industrial processes or are not sufficiently sensitive to be considered as an effective damage limiting means, which also applies to the output signal evaluating unit and the activation unit.

Sensor units of this kind tend to react to individual particles that are not harmful in certain circumstances, while in other circumstances they fail to react to individual particles that can cause damage by fire or explosion.

In this regard, it has been found necessary to maintain a safety range that is so large as to cause the equipment to react to particles that can cause no damage rather than not react to particles that are liable to cause damage, this being a preferred safety measure.

It is known to use temperature detectors in the present context, although experiences have shown in practice that these detectors often fail to react until a fire has already developed.

Although flame detectors used in the present context are sensitive to small (low) flames, their use in a preventative, protective system is excluded because they react much too late.

It is also known to use pressure detectors that operate with high sensitivity and with small time constants, but also such detectors normally require an initial explosion or combustion in order to react.

It is also known to use wavelength-related detector arrangements.

Practical experiences, however, indicate that even discrete particles that radiate solely within one wavelength range, solely for thermal radiation in a transport path, having a temperature in the range of 400° C. are a fire and explosion risk in various process plants where combustible, finely divided and loose material is transported with the aid of a vehicle gas or vehicle gas mixture, preferably an air stream.

The contents of Patent Publication U.S. Pat. No. 5,193,622, which describes a detector arrangement that includes a sensor unit, also belongs to the known prior art. Patent Publication SU-A1-1,729,528 teaches a detector arrangement that includes several sensor units.

With respect to the features associated with the present invention, it can be mentioned that Patent Publication U.S.

Pat. No. 5,749,420 describes a detector arrangement in which an indicating and activating unit 12 is adapted to evaluate and sense the radiation intensity from each of a number of sensor units 105, 107.

With respect to the aforementioned publications, the sensor units used are adapted to receive summated each wavelength-related radiation intensity from a large wavelength range or from the whole of the wavelength spectrum of the particle.

DISCLOSURE OF THE INVENTION

Technical Problems

When taking into consideration the technical deliberations that a person skilled in this particular art must make in order to provide a solution to one or more technical problems that he/she encounters, it will be seen that on the one hand it is necessary initially to realise the measures and/or the sequence of measures that must be undertaken to this end, and on the other hand to realise which means is/are required to solve one or more of these problems, and on this basis, it will be evident that the technical problems listed below are highly relevant to the development of the present invention.

With respect to the singularities associated with the present invention, it is necessary to realise that each individual, discrete particle of loose particulate material carried in a transport system that has an elevated energy content will generate radiation that can spread within a wide wavelength spectrum which may extend from the range of ultraviolet radiation (UV radiation) to the infrared radiation or thermal radiation range (IR radiation) via visible radiation, and that thermal radiation is of particular significance to the system in the case of many applications.

This wavelength spectrum or large wavelength range can also be divided into a number of narrow wavelength ranges.

When considering the present state of the art as described above, it will be evident that a technical problem resides in creating with the aid of simple means a detector arrangement that is highly reliable and with which the activation unit will take an activation mode solely when there is a real danger of fire or a corresponding hazard, and which enables the safety range to be kept within narrow limits.

It will also be seen that a technical problem is one of realising the significance of establishing, usually empirically, an adapted, relevant large wavelength range within which the wavelength spectra of the particles can be evaluated, with respect to every process plant and combustible, finely divided loose material used therein.

Another technical problem is one of realising the significance of establishing for each process plant and the combustible, loose, finely divided material used therein, a suitable number of narrow wavelength ranges and the width of the wavelength ranges located within the adapted large wavelength range that is the subject of evaluation, said number of narrow wavelength ranges normally being established empirically.

It will also be seen that a technical problem is one of realising the significance of adapting the width of each of the selected number of wavelength ranges in dependence on the process plant used and the loose material handled therein, so as to provide a high safety factor within a narrow safety range, and so that activation of relevant safety means will only take place in the event of real danger.

It will also be seen that a particularly technical problem is one of enabling the total energy content of a single particle to be evaluated with the aid of simple means, by evaluating and signal-processing only relevant intensity values that can be evaluated within chosen, limited narrow wavelength ranges.

Another technical problem resides in the ability to approximate a complete intensity curve for a single particle with the aid of a few measuring points, by choosing measuring points within a limited, relevant wavelength range.

Another technical problem is one of realising the significance of and the advantages associated with establishing, normally empirically, for each process plant and loose combustible material handled therein an adapted sub-intensity value for each evaluatable narrow wavelength range, so that the activation unit will be able to adopt an activation state immediately when only one or a few of the sub-intensity values sensed exceeds/exceed a corresponding, adapted and determined sub-intensity value.

Another technical problem resides in choosing from among a total number of available wavelength ranges a smaller number of narrow wavelength ranges which must indicate in respect of a single particle the sub-intensity values that correspond to or exceed established and adapted sub-intensity values so as to cause the activation unit to adopt an activation mode, this choice being made in respect of each process plant and the combustible material handled therein.

With regard to the known prior art as described above, the primary aim of the present invention is to provide an improved detector arrangement which is able to evaluate the energy content of loose, discrete particles in the process plant in a more positive and more simple manner, and also to be able to detect and indicate single particles that have a temperature slightly below 400° C.

Another technical problem is one of realising the advantages that are afforded when at least two of the sensor units or sensor sections in the inventive detector arrangement have sensing lobes which cover the cross-section of a loose material transportation path, and to accurately establish the energy content of an indicated single particle on the basis of received signals related to a narrow wavelength range, regardless of the orientation of the particle in said cross-section and while taking the distance from respective detectors into account.

In this respect, a technical problem resides in creating with the aid of simple means a detector arrangement in which a first sensor unit or section of said unit is able to sense, or detect, the sub-energy content of a single particle present and the sub-intensity value within a first narrow wavelength range, and that a second sensor unit or section thereof is adapted to sense, or detect, the sub-energy content and sub-intensity value of said particle within a second narrow wavelength range, and that an evaluating unit is adapted to process the output signals from both said sensor units and accordingly either inhibit actuation of an activation unit to an activation mode or to cause said activation unit to switch to its activation mode.

Another technical problem is one of realising the significance of and the advantages that are afforded by adapting a sensor unit to sense, or detect, the sub-energy content of a particle within mutually separate, narrow wavelength ranges located within the full wavelength spectrum of the particle radiation with respective wavelength ranges having one and the same width or mutually different widths.

Another technical problem is one of realising the significance of and the advantages that are afforded when a plurality of sensor units or sensor sections are adapted to sense, or detect, the sub-energy content of a particle and/or its sub-intensity within mutually overlapping wavelength ranges.

Another technical problem is one of realising the significance of and the advantages that are afforded by allowing the evaluating unit to compare the sub-intensity of a received output signal with a stored and maximised wavelength range value, and to actuate the activation unit in the event of the sub-intensity of an output signal exceeding said maximised value.

Another technical problem is one of realising the significance of and the advantages that are afforded by enabling the evaluating unit to compare the sub-intensities of a plurality of received output signals with a plurality of stored, maximised wavelength range values and to cause the activation unit to switch to its activation mode when the sub-intensities of predetermined output signals and/or with a predetermined number of output signals exceed said maximised value.

Another technical problem is one of realising the significance of and the advantages that are afforded by choosing said narrow wavelength ranges with a wavelength within the heat radiating range, such as a wavelength greater than 1.0 $\mu$M.

Another technical problem is one of realising the significance of and the advantages afforded by choosing a narrow wavelength range or narrow wavelength ranges that have a wavelength within 1.2 to 5.0 $\mu$M, such as 1.4 to 3.5 $\mu$M.

Another technical problem is one of realising the significance of and the advantages afforded by adapting the chosen narrow wavelength ranges and the maximised wavelength values related thereto in accordance with one or more of the following criteria: choice of material to be transported, material in anticipated particle presence, the design of the preventative, protective system, the process concerned, etc.

Another technical problem is one of realising the significance of and the advantages afforded by adapting a sensor unit or sensor sections to evaluate the sub-energy content of a particle within at least three, preferably more, and, e.g., up to ten, different narrow wavelength ranges located within the full wavelength spectrum of the radiation.

It will also be seen that a technical problem is one of realising the significance of and the advantages afforded by adapting the evaluating unit to evaluate a sensed, or detected, sub-intensity-dependent wavelength-related output signal deriving from a narrow wavelength range from each of said sensor units or sensor sections, and to co-ordinate the sub-intensity-dependent signals so as to be able to calculate and also to establish the relevant energy content of the particle and its disposition to initiate fire and/or explosion in a downstream risk zone.

It will also be seen that a technical problem is one of realising the significance of arranging said sensor units or sensor sections, each being allocated a narrow wavelength range, diametrically and/or uniformly around an inner peripheral surface of a tubular conduit of circular cross-section, and then to realise the significance of the orientation of the number of sensor units and/or sensor sections used.

It will also be seen that a technical problem resides in realising the significance of positioning the sensor units and/or the sensor sections opposite one another about an inner perimeter surface of a tubular conduit of angular cross-section and to realise the significance of placing the sensor units and/or the sensor sections in the corners of said conduit.

Another technical problem is one of realising the significance of coordinating the sensor units symmetrically and diametrically opposite one another around an inner peripheral surface of a tubular conduit having a right-angled cross-section, and to realise for which applications said sensor units and/or said sensor sections shall be placed in the corners of said conduit.

Another problem resides in realising the advantage of using a sensor unit and/or a sensor section that has a detection angle of about 180 degrees and a sensing lobe that has a corresponding semi-circular shape.

Another technical problem is one of realising the significance of covering each sensor unit and/or its sensor section with a protective cover that includes a plurality of mutually adjacent slots, said slots preferably being orientated in a direction perpendicular to or generally perpendicular to the feed direction of said material, and all of the sensor units and/or the sensor sections being co-ordinated around one and the same cross-section plane through the transport paths.

Another technical problem is one of designing the sensor unit in accordance with circumstances that prevail at a particular time, either by adapting a sensor unit to evaluate the sub-intensity values for a plurality, such as all, chosen narrow wavelength ranges, or by choosing a number of sensor units which are each adapted to evaluate the sub-intensity value of one narrow wavelength range or of a few narrow wavelength ranges.

Solution

With the intention of solving one or more of the aforesaid technical problems, there is provided in accordance with the present invention an arrangement which can be included beneficially in a preventative, protective system of the aforedescribed kind, said arrangement including light-sensitive and heat-sensitive devices in the form of a sensor unit and associated sensing circuits for detecting a single particle that has a high energy content.

There is normally used in such a detector arrangement at least two sensor units or sensor sections whose sensing lobes are intended to cover a cross-section of the transportation path of loose particulate material.

The present invention relates particularly to a detector arrangement which can be adapted for inclusion in a preventative, protective system and that includes a number of sensor units or sensor sections, a unit for evaluating the output signals of said sensor units and an activation unit which is coupled to the evaluating unit, wherein sensing of at least one individual particle whose energy content established in the evaluating unit is found to exceed a predetermined value is able to switch the activation unit from a first state to a second state.

It is particularly proposed in accordance with the present invention that a first sensor unit or sensor section is adapted to sense the sub-energy content of said individual particle and/or its sub-intensity value within a first narrow wavelength range, that a second sensor unit or sensor section is adapted to sense the sub-energy content of the same individual particle and/or its sub-intensity value within a second narrow wavelength range, and that an evaluating unit is adapted to allow the output signals from both sensor units or sensor sections to be processed and to inhibit actuation of the activating unit to its activating position or to cause said activation unit to switch to its activation state on the basis of the result.

By way of preferred embodiments that lie within the scope of the present invention, it is proposed that a plurality of sensor units or sensor sections are adapted to sense the sub-energy content of a particle and/or its sub-intensity value within a number of mutually separate narrow wavelength ranges.

A plurality of sensor units or sensor sections may be adapted to sense the sub-energy content of a particle within mutually overlapping wavelength ranges.

It is also proposed that the evaluating unit shall be adapted to allow a comparison to be made between the sub-intensity of a received output signal and a stored maximised wavelength range-related value and to cause the activation unit to switch to its activating mode when the sub-intensity of an output signal exceeds said maximised value.

The evaluating unit will preferably be adapted to compare the intensity of a plurality of received output signals with a plurality of stored maximised values related to wavelength ranges and to cause the activation unit to switch to its activating mode only when the sub-intensities of a predetermined number of output signals exceed said maximised values.

Each of the narrow wavelength ranges will preferably have a wavelength greater than 1.0 $\mu$M.

More specifically, said narrow wavelength ranges are chosen from within a selected large wavelength range, such as 1.2 to 5.0 $\mu$M.

The selected narrow wavelength ranges and the maximised values related thereto are adapted to one or more of the following criteria: the nature of the material being transported, the nature of the material in said particle, the design of the preventative, protective system, the process concerned, etc.

It is also proposed that a sensor unit or a number of sensor sections are adapted to evaluate the energy content of an individual particle present and/or its intensity within at least three narrow wavelength ranges located within the total wavelength spectrum or a chosen large wavelength range with respect to the radiation emitted by an individual particle.

It is also proposed in accordance with the invention that the evaluating unit and the activation unit are adapted to evaluate a sensed wavelength-related sub-intensity from each of said sensor units or sensor sections, and to co-ordinate the received sub-intensity-dependent wavelength-related signals so as to be able to calculate and establish therefrom the energy content or the like of said particle and therewith be able to estimate the disposition of the particle to initiate relevant fire and/or explosion criteria in respect of a specific system and its material properties.

By way of proposed embodiments that lie within the scope of the inventive concept, it is proposed that said sensor units or sensor sections are disposed diametrically opposite one another or are uniformly spaced around the inner perimeter surface of a tubular conduit of circular cross-section.

It is also proposed that said sensor units or sensor sections are disposed opposite one another around the inner perimeter surface of a tubular conduit of angled cross-section, and to place said sensor units or sensor sections in the corners of said conduit.

The sensor units or sensor sections are disposed symmetrically and in mutually opposed relationship around the inner perimeter surface of a tubular conduit of right-angled cross-section, and are preferably placed in the corners of said cross-section in respect of certain applications.

According to the invention, each sensor unit or sensor section has a detection angle of about 180 degrees.

It is particularly proposed that each sensor unit or sensor section can be covered with a protective cover that includes a plurality of mutually adjacent slots that are orientated in a direction perpendicular to or substantially perpendicular to the feed direction of said material, and that all sensor units or sensor sections are orientated in one and the same plane or are at least orientated so that an individual particle passing two or more sensor units or sensor sections can be evaluated simultaneously or generally simultaneously by all of said sensor units or sensor sections.

The invention also enables the use of one single sensor unit that is constructed to evaluate all of the intensity values relating to the chosen narrow wavelength ranges, or a chosen number of sensor units which are each adapted for evaluating the sub-intensity value of a narrow wavelength range or of a few narrow wavelength ranges.

Advantages

Those advantages that are primarily afforded by an inventive detector arrangement and particularly when said arrangement is included in a preventative and protective system reside in the provision of conditions which enable two or more sensor units or sensor sections to evaluate the high energy content of individual, loose particles passing said sensor units or sensor sections with greater precision than was earlier possible regardless of the position of the particle within a cross-section of its path as a result of sensing such a particle in each of the sensor units or sensor sections simultaneously with mutually discrete and narrow wavelength ranges located within the wavelength spectrum of the total radiation of the particle and by processing the sub-intensity signals generated by said single particle from each of the sensor units or sensor sections so as to enable the relevant energy content of the particle to be established and to cause an activation unit to be brought to an activating mode when said energy content exceeds a predetermined value.

In particular, a plurality of sensor units or sensor sections evaluate sub-intensities of the particle and on the basis of these sub-intensities and a stored control value the relevant energy content of the particle is evaluated and an activation circuit is activated when this evaluated value exceeds a predetermined value.

The main characteristic features of an inventive detector arrangement are set forth in the characterising clause of the accompanying claim 1.

BRIEF DESCRIPTION OF THE DRAWINGS

An embodiment of an inventive detector arrangement at present proposed and the application of such an arrangement in a preventative and protective system will now be described in more detail with reference to the accompanying drawings, in which

FIG. 3 is a cross-sectional view of a transport conduit in the form of a three-walled tubular part, with a sensor unit or sensor section positioned in each corner;

FIG. 4 is a cross-sectional view of a circular transport conduit with four sensor units or sensor sections positioned symmetrically therein;

FIG. 5 is a cross-sectional view of a square transport conduit and shows four sensor units or sensor sections positioned at the corners of said conduit;

FIG. 6 illustrates the principle of the present invention in evaluating the relevant energy content of a high temperature particle that passes each of a number of sensor sections incorporated in a sensor unit;

FIG. 7 illustrates schematically the use of seven sensor sections for sensing the sub-intensity within a respective narrow wavelength range within the total wavelength spectrum of a heat radiating particle, where each of said sensor sections is coupled to an output signal evaluating unit and an activation unit;

FIG. 8 is a graph in which a maximum energy is given as the function of the wavelength and illustrates the division of the total wavelength spectrum of a heat radiating particle in accordance with the invention;

FIG. 9 shows in sections A, B and C different co-ordinations of chosen narrow wavelength ranges within a chosen large wavelength range;

FIG. 10 illustrates an embodiment in which a number of sensor units, such as two sensor units, are coordinated for evaluating a respective narrow wavelength range;

FIG. 11 illustrates an embodiment in which a single sensor unit is adapted to evaluate a chosen number of narrow wavelength ranges, such as three such ranges; and FIG. 12 illustrates an embodiment in which a single sensor unit is adapted to evaluate a chosen number of narrow wavelength ranges, such as three such ranges, through the medium of a filter element.

DESCRIPTION OF EMBODIMENTS AT PRESENT PROPOSED

Figure 1:
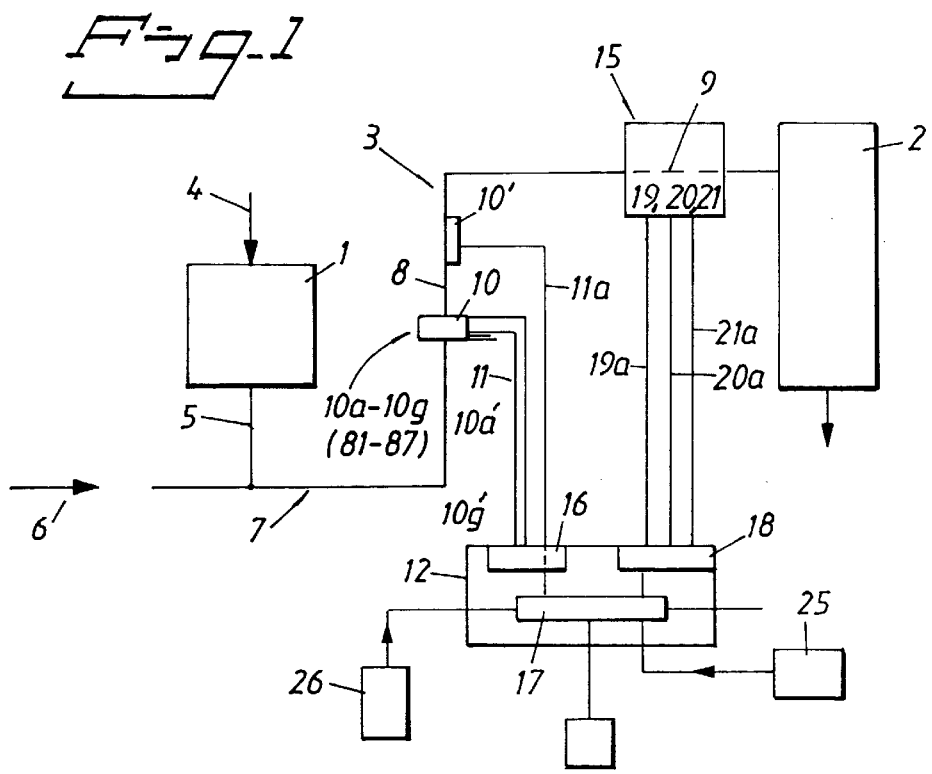
FIG. 1 is a block schematic illustrating generally a production process in which an inventive detector arrangement with accompanying evaluating unit and activation unit is used.

FIG. 1 thus illustrates a preventative, protective system for application in a process, an industrial process, in which loose material is produced in a first unit 1 and transported to a receiving, second unit 2 through a transport system 3.

The invention is based on the concept that treated material, such as disintegrated paper pulp, e.g. cellulose fluff, is fed into a mill 1 in the direction of arrow 4 and transported to the second unit 2, in the form of a silo, with the aid of an air stream 6 and through the medium of a conduit system 7, 8, 9 included in the transport system 3. The exemplified disintegration of the paper pulp in the unit or mill 1 can cause one or more individual particles to be heated to a temperature of sufficiently high magnitude to initiate a fire and/or an explosion within at least the second unit 2, and also within the transport system 3.

Although the illustrated embodiment refers to the use of paper pulp that shall be disintegrated and transported by an air stream to a silo, it will be understood that the inventive concept can also be applied to other fields and also for other purposes and, in particular, for other materials.

The invention also requires all disintegrated particles to be transported as loose material by a gas or gas mixture, normally air.

In addition, the concept of the invention also requires the material treated to be of such nature that individual particles may well have a heat content or thermal energy content that can cause a fire in the conduit system or in the storage space, i.e. the so-called risk zone 2.

In accordance with the invention, transportation of the loose material in the conduit 5 between said first unit 1 and said second unit 2 is effected by a transport system 3 which includes, among other things, a stabilising zone 7, a zone 8 which indicates the presence of particles that have high temperatures, and an extinguishing zone preceding a risk zone 2.

The temperature indicating zone 8 includes initially a plurality of sensors 10 with one or more sensor units or sensor sections 10a–10g constructed in accordance with the present invention, as evident from the following description.

The sensor units 10a–10g may be orientated in one and the same plane transversely of the conduit 8, as shown in FIGS. 3 to 5, although they may alternatively be spaced apart at adapted distances along said conduit.

The invention is described in the following with reference to a single sensor unit 10 that includes a number of sensor sections 10a–10g.

The person skilled in this art will be aware of how the signal from several sensor units shall be evaluated and of the time factors that need to be included for evaluating mutually spaced sensor-unit signals, and consequently this will not be described in detail.

A chosen number of sensor sections 10a–10g are able to co-act with a sensor-section output signal evaluating unit 16 over a multi-wire line 11, wherein the evaluating unit 16 is connected to or included in an activating unit 12.

When one of the chosen number of sensor sections 10a–10g indicates the presence of an excessively hot individual particle, the unit 12 will activate a device 15 associated with the extinguishing zone 9 such as to deliver an extinguishing substance and/or to effect removal of the particles.

According to the present invention, a wavelength range related sub-intensity dependent on respective sensor sections 10a–10g can be evaluated via the unit 16 included in the activating unit 12 and, with the aid of a calculating circuit 17, can activate a selected danger avoiding measure, said avoidance measure being one of several available measures although being an indicated and suitable measure.

The aforesaid evaluated wavelength-related sub-intensity and the sum of a plurality of such evaluated sub-intensities provides a positive indication of the relevant energy content of a particle and its danger potential and can be used as the basis for a narrow safety range.

When danger is indicated, the measure activated may consist in the choice of a device available among a plurality of devices, such as one of the three illustrated devices 19, 20 and 21, in response to an activation signal present on the lines 19a, 20a or 21a.

Alternatively, one and the same device may be caused to be used to a greater or lesser extent, by modifying the signal on one of said lines.

The invention also proposes that the calculating circuit, or computing circuit, 17, can be programmed so that the choice of an appropriate action will depend on the nature of the process and can be introduced via a circuit 25 connected to the activation unit 12.

One measure may, for instance, comprise the activation of a valve in the conduit section 9 so as to deflect a collection of material that includes said particles.

The sensor sections 10a–10g are placed at a distance from said first unit such that loose particles of low energy contents will be able to pass respective sensor sections without initiating activation of the unit 12 and therewith making a selection via the unit 18.

The measures activated may also consist of engaging an entire water-based extinguishing system or solely parts of system, wherein different nozzles in said system can be actuated by means of signals delivered on the lines 19a and 20a.

A signal on the line 20a will activate two solenoid valves so that pressurised water in the water conducting system can be sprayed on the material under transportation.

A single, further solenoid valve is activated via the line 19a.

The water system can be switched-off via a line not shown.

The calculation unit 17 is programmed to determine the safety measure that shall be taken and also the duration of said measure.

The calculation unit 12 may also be programmed, via a circuit 26, to take into account internal process conditions, such as the nature of the material being handled, the time delay required in view of the speed at which material is being transported at that moment in time, said speed being evaluated by a sensor 10' whose output signal is delivered to the circuit 17 on a line 11a.

The unit 12 may also be programmed to take into account the design of the extinguishing equipment and its method of operation, so that an extinguishing zone will be developed immediately upstream of the point at which the hazardous particle enters said zone.

Reference is made to the contents of Patent Publication U.S. Pat. No. 5,749,420 for a more detailed description of the general process according to FIG. 1.

The present invention is based on several fundamental assumptions that are described in more detail below with reference to FIG. 2.

Figure 2:
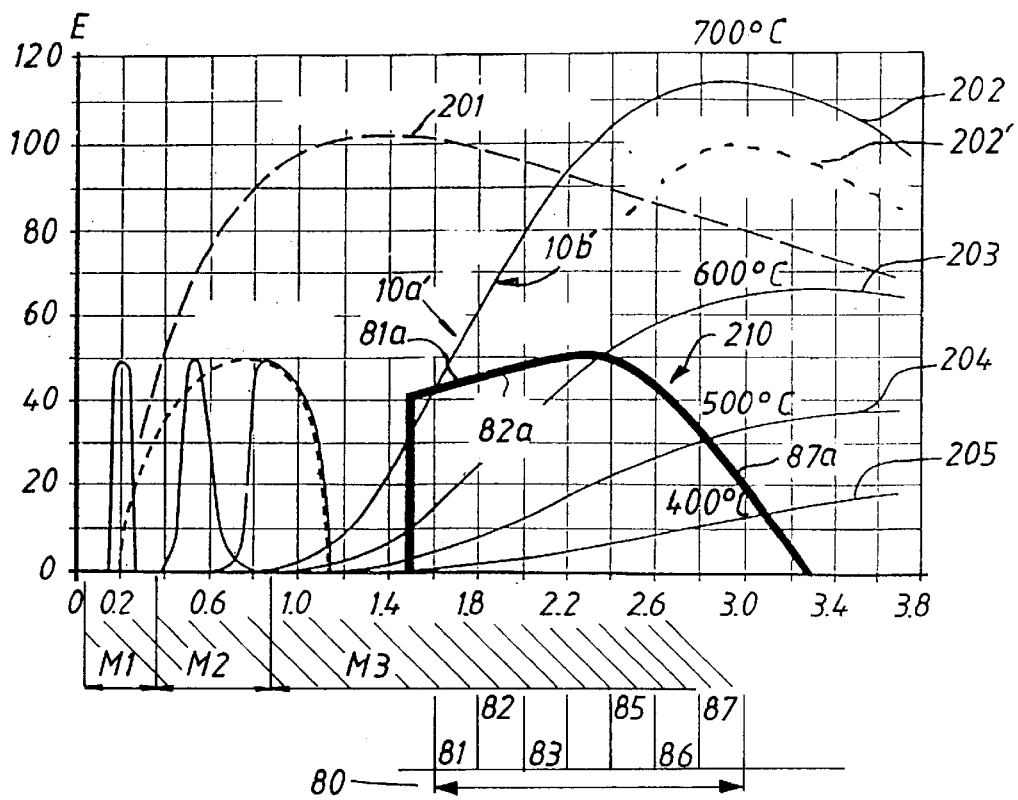
FIG. 2 is a graph, which illustrates energy as a function of wavelength and wherewith individual heat radiating particles having a temperature of above 400° C. can be evaluated.

FIG. 2 illustrates a number of graphs relating to the energy content (E) of a number of particles as a function of wavelength ($\mu M$), wherein the total energy of respective particles constitutes the integral of the curve concerned.

In the illustrated case, the wavelength ($\mu M$) is divided into a number of wavelength sections where one wavelength section M1 illustrates UV light, one wavelength section M2 illustrates visible light, and one wavelength section M3 illustrates IR light or thermal radiation, this latter wavelength section M3 being particularly significant to the invention.

In connection herewith, it can be assumed that a particle having a mass and a temperature according to graph 202 has a total energy content that corresponds to the integral over the wavelength range of the curve 202.

It has been found that a heat content representative of certain wavelength ranges (0.8–1.3; 3.3 and higher) is not significant with respect to determining the relevant energy content of the particle and decisive in evaluating the liability of the particle to cause combustion or some other danger.

Accordingly, the invention is based on the assumption that solely a wavelength range 80, which can be considered to be representative of the relevant energy content of the particle, shall be evaluated by dividing this wavelength range into a number of narrower wavelength ranges greater than two, and to sense the prevailing sub-intensity within each selected wavelength range.

For a chosen system, the relevant energy content of each particle can now be represented by a graph 210.

The graph 201 illustrates the wavelength-dependency of the energy generated by an incandescent lamp (2000° C.), while the graphs 202–205 illustrate the wavelength-dependency of the energy content of individual particles heated to a temperature of 700, 600, 500 and 400° C.

Each individual particle that has an elevated energy content will generate radiation, which is distributed over a large wavelength spectrum, such as a wavelength spectrum of from 0.8 to 5.0 $\mu M$ with respect to a particle according to the graph 202.

The graph 202, and also the remaining graphs, shall be understood to distribute the energy-dependent intensity for each wavelength section in respect of a particle that has a given mass and that derives from a given material and has a temperature of 700° C.

In the case of a corresponding particle of lower mass, the graph 202' will have essentially the same appearance but will be located slightly beneath the graph 202.

In accordance with the present invention, there is established for a given process and a given material a large or broad wavelength range 80, from 1.5–3.3 $\mu M$, within which very broad wavelength spectra of from 0.8 to approximately 5.0 $\mu M$ of the particle can be evaluated and relevant assessment of requisite criteria for avoiding danger can be assessed, said wavelength range 80 normally being determined empirically.

A number of narrow wavelength areas or sections 81–87 within the larger or broader wavelength range 80 are determined, normally empirically, said wavelength sections 81–87 being seven in number in the illustrated case.

The width of each of these narrow wavelength areas 81–87 shall be mutually adapted so as to provide a high safety factor.

Thus, it lies within the scope of the invention to give the individual narrow wavelength areas mutually different wavelength widths.

According to the invention, a sub-intensity value 81a–87a for each evaluatable narrow wavelength area 81–87 can be determined, normally empirically, so that the activation unit 12 will be able to take an activating position, via the circuits 17 and 18, immediately the sub-intensity values sensed exceed respectively the established sub-intensity values.

The activation unit 12 that includes the output signal evaluating unit 16 may also be adapted to choose from the total number of wavelength ranges 81–87 a smaller number of wavelength ranges for each process plant and for the combustible material used therein, wherewith this smaller number of wavelength ranges necessarily indicating for one and the same particle the sub-intensity values that correspond to or exceed the determined sub-intensity values so as to bring the activation unit 12 to an activating mode via the circuit 18.

It is of course also within the frame of the invention to use a sensor unit for each of the narrow wavelength ranges 81–87 and to adapt a sensor unit to receive radiation solely within its designed wavelength range, as described in more detail below with reference to FIGS. 10, 11 and 12.

This adaptation may be made with the aid of optical filters or by appropriate selection of material in the sensor surfaces.

The following description illustrates a sensor unit that is comprised of seven sensor sections 10a–10g, one for each of said narrow wavelength ranges 81–87.

Respective maximum permitted sub-intensity values 81a to 87a for each of the wavelength ranges 81 to 87 have been combined in a graph 210 in FIG. 2.

It will be apparent that the activation unit 12 is actuated and a choice made via the circuit 18 for each sub-intensity value applicable to the graph 202, since the current sub-intensity values represented in the graph 202 and related to respective wavelength ranges 81 to 87 exceed the corresponding sub-intensity values 81a to 87a represented in the graph 210.

An indication for activation of the activation unit 12 is given for the wavelength sections 85 to 87 with respect to a particle having an intensity according to graph 203, whereas the wavelength sections 81 to 84 lack such an activation indication.

The software in the evaluating unit 16 and in the computer circuit 17 now determines whether the activation unit 12 shall actuate the circuit 18 or not. This decision may depend on the difference between the sub-intensity values in respective graphs 203 and 210 and/or on an evaluation of the significance of respective wavelength ranges.

With respect to a particle having a mass and a temperature according to graph 204, only the wavelength section 87 will initiate activation, and the evaluating unit 16 can then decide, in co-action with the computer circuit 17, not to allow the activation unit 12 to activate the circuit 18.

It will be clearly apparent from the aforegoing that the distribution of the graph 210 along the wavelength range 80 of maximum related sub-intensity values can vary in accordance with set requirements.

For instance, the graph 210 may be different for different material selections, and it will be understood that the structure and configuration shown in FIGS. 2 and 7 are merely examples.

FIG. 3 is a cross-sectional view of a symmetrical triangular conduit 18 which embraces a stream of airborne particles, and in which sensor units 101, 102 and 103 each comprising seven sensor sections are provided in the corners of the triangle in the manner shown in FIG. 3.

FIG. 4 is a cross-sectional view of a circular conduit 8 that includes sensor units 104, 105, 106 and 107 each comprising seven sensor sections that are orientated symmetrically with relation to each other and directly opposite one another.

Alternatively, the conduit may include three sensor units or more than the illustrated four sensor units.

FIG. 5 is a cross-sectional view of a conduit 8 in which sensor units 108, 109, 110 and 111 each comprising seven sensor sections are provided in the corners of the conduit.

In the case of the FIG. 5 embodiment, the sensor units may alternatively be positioned centrally with a wide sensing lobe of 180 degrees in respect of the sides 112, 113, 114 and 115 of said conduit. The position of the sensors will depend on the application.

According to one embodiment of the present invention, each of the sensor units, such as the sensor unit 104 in FIG. 6, is provided with a number of slots 104a to 104g, e.g. seven slots, where each slot is orientated in a plane perpendicular to the transport direction -P- and where each slot is coordinated with a sensor section 10a, 10b . . . 10g.

Thus, a first slot 104a positioned upstream of the transport direction P is allocated a first plane 51, a respective second slot 104b is allocated a second plane 52 that is parallel with the first plane, and so on up to plane 57.

FIG. 6 also illustrates how an individual particle having an elevated temperature according to graph 202 first passes a point (p1) in the plane 51 and thereby activate a pulse 10a' delivered to the plane 51 and intended for the sensor section 10a in the unit 104.

When the same particle then passes the next point (p2), there is obtained in a corresponding manner and to a corresponding degree a signal 10b' for the sensor section 10b, via the sensor unit 104, and so on.

Thus, a particle that has a sufficiently high energy content will be able to indicate seven high sub-intensity related pulses, one within each narrow wavelength range 81–87, as said particle passes through the planes 51–57 in the conduit 8.

A specific calculation or computation is required to calculate and evaluate the result of the indications obtained from the various sensor sections 10a–10g, as described below.

In order to compensate to the best possible extent for the contingency when the light intensity and/or the intensity of thermal radiation from a particle decreases with the square of the distance from a sensor unit or sensor section and increases with the square of the distance to a sensor unit or sensor sector, an adapted calculation will preferably be made from the sub-intensity values obtained from a plurality of sensor units orientated in mutually the same cross-sectional plane of the conduit section 8 and according to the application of the invention, on the basis of signals received from each of corresponding sensor sections (10a–10g), so as to be able to determine the relevant energy content of said particle at that moment in time.

It also lies within the possibilities afforded by the invention that when a particle has passed a chosen number of planes, such as the planes 51, 52 and 53, and each of these planes has indicated a sufficiently high signal for activation of an extinguishing means belonging to the extinguishing zone and/or a particle removal means 19, 20, 21, such activation can be triggered after a given number of clear indications, for instance three indications.

As shown in FIG. 7, the present invention relates more particularly to a detector arrangement that can be included in a preventative protective system, comprising a number of sensor units or sensor sections 10a–10g, and a unit 16 for evaluating sensor-unit output signals and included in an activation unit 12 having a calculating circuit or computer circuit 17.

In each case, the presence of a particle sensed normally by a plurality of the sensor sections 10a to 10g and having an energy content established in the evaluating unit 16 as exceeding a predetermined value can cause the activation unit 12 containing the circuits 17 and 18 to switch from a first state to a second state.

A first sensor section 10a is adapted to sense the sub-energy content of the particle within a first narrow wavelength range 81. A second sensor section 10b is adapted to sense the sub-energy content of the particle within a second, narrow wavelength range 82 and so on up to and including the sensor section 10g.

A summation of the energy contents for each wavelength range 81–87 will give a total sum that is smaller than the total energy content of the particle while, nevertheless, containing sufficient information to constitute a significant indication of the total energy content of the particle and thus its disposition to initiate combustion, explosion or to present some other danger.

The chosen curve form 210 is thus very critically similar to the location of the wavelength range 80 along the wavelength axis, the number of wavelength sections and the wavelength width of said wavelength sections.

The output signal evaluating unit 16 is adapted to process the output signals received from a number of the sensor sections 10a–10g or from all said sensor sections and to inhibit actuation of the activation unit 12 and the circuit 18 or to initiate activation of said unit and said circuit on the basis of the result obtained.

Thus, a number of sensor sections 10a–10g shall be adapted to sense the relevant energy content of a particle within mutually separate, narrow wavelength ranges 81–87 and 81'–87' respectively (see FIGS. 9A to 9B).

A number of sensor sections 10a–10g shall also be capable of sensing the relevant energy content of a particle within mutually overlapping wavelength ranges, where the wavelength ranges 88 and 89 are overlapped by the wavelength range 88' (see FIG. 9C).

The evaluating unit 16 according to FIG. 7 is also designed to compare the sub-intensity 10a',10b' to 10g' of each received output signal with a stored maximum value 81a, 82a to 87a relating to said wavelength ranges, and to send a signal which solely and clearly indicates the signal structure when the sub-intensity of an output signal exceeds said maximised value 81a, 82a to 87a; maximised value 81a smaller than the signal value 10a; or sends to the calculating circuit 17 a signal that indicates the difference value (10a'–81a).

The evaluating unit 16 according to FIG. 7 is thus designed to compare the sub-intensities of a plurality of received output signals 10a'–10g' with a plurality of previously stored maximised values 81a to 81g relating to wavelength ranges.

In a first embodiment, it is required that all output signals 10a'–10g' from the sensor sections 10a to 10g shall be higher than those significant to the stored values 81a–81g corresponding to the graph 210, in order for the calculating circuit 17 to send a signal to the circuit 18.

In a second embodiment, it may be required that a chosen predetermined number of output signals whose respective sub-intensities exceed said maximised value are at least required for causing the calculating circuit 17 to send a signal to the circuit 18.

FIG. 7 is intended to indicate by way of example that the sensor sections 10a, 10c, 10d and 10e alone shall indicate, via their output signals 10a', 10b'. . . 10g', an excessively high, relative energy content for actuation of the circuit 18 via a calculating circuit 17 included in a function block 17.

The signal 10a' is compared with the value 81a in a comparison circuit 71, and a signal indicating an excessively high value is sent on line 71a when the value of the signal exceeds the stored value.

The comparison circuit 71 may be modified so that the signal transmitted on the line 71a will correspond to the evaluated difference value.

In this latter application, it may be convenient to evaluate the magnitude of the difference values, such as values 10a'–81a, via a circuit 17', and to initiate activation of the circuit 18 only in the event of a value that exceeds a determined limit value.

It is also possible to weight the values, such as values 10a'–81a, and therewith allot greater significance to certain values within more meaningful wavelength ranges than others.

The wide wavelength range intended for evaluation purposes is chosen with a wavelength that exceeds 1.0 $\mu$M and lies within the UV range or the heat radiating range M3, specifically, said wavelength range is chosen with a wavelength within 1.2 to 5.0 $\mu$M, such as 1.4 to 4.0 $\mu$M.

The chosen, narrow wavelength ranges and the maximised wavelength range-related values 81a, 82a to 87a related to said narrow wavelength ranges are adapted to one or more of the following criteria: the material to be transported, the vehicle gas used, the anticipated material in the individual particle present, the design of the preventative, protective system, the process concerned, etc.

A sensor unit 10 including sensor sections such as sections 10a–10g is adapted to evaluate the relevant energy content of an individual particle by using to this end only a few narrow wavelength ranges, such as from three to ten such ranges.

The design of the sensor unit 104 is such that conditions exist within a casing for evaluating the sub-intensity value of discrete, narrow wavelength ranges 81 to 87 in the integrated sensor sections 10a to 10g.

As evident from FIG. 10, an optical filter and a related sensor unit 10a, 10b . . . 10g may be used for each narrow wavelength range.

Beams or rays within the wavelength spectrum of the particle and at least within the wavelength range 80 radiate in onto an optical filter 90a which allows beams or rays within the wavelength range 81 to pass through to a sensor unit 10a. Beams or rays within the wavelength range 80 radiate in onto an optical filter 90b which allows radiation in the wavelength range 82 to pass to a sensor unit 10b, and so on.

The signals carried on the lines 11b, 11c . . . 11g are coordinated in the calculating circuit 16 and compared with the stored values 81a, 82a . . . 87a.

FIG. 11 illustrates an embodiment where the wavelength spectrum of the particle and at least the large wavelength range 80 radiates in towards a number of optical filters 90a, 90b and 90c, three such filters in the illustrated case, which allow radiation in the wavelength ranges 81, 82 and 83 to pass to a common sensor unit 10k which receives these sub-intensities and co-ordinates the same by summation to the calculated unit 16, via a line 11k.

FIG. 12 illustrates a combined optical filter 90m which is provided with a number filter sections 90n, 90o and 90p, in the illustrated case three, where each filter section is adapted to allow a narrow, wavelength range 81, 82 and 83 to pass concentrated to a sensor unit 10k, according to FIG. 11.

It will be obvious from this that safer detection is achieved when applying the conditions required to indicate fire danger or some other danger from values that are only slightly beneath the lowest ignition temperature of the loose material and its concentration.

It will be understood that the invention is not restricted to the described and illustrated exemplifying embodiment thereof and that modifications can be made within the scope of the inventive concept as illustrated in the accompanying claims.

What is claimed is:

1. A detector arrangement adapted for use in a preventative, protective system and comprising a number of sensor units or sensor sections, a sensor-unit output signal evaluating unit, and an activation unit which co-acts with said evaluating unit, wherein at least one particle whose presence is sensed by the sensor units and that has an energy content determined by the evaluating unit that exceeds a predetermined value causes the activation unit to switch from a first state to a second state, wherein a first sensor unit or sensor section is adapted to sense the sub-energy content of a particle and/or the wavelength intensity of said particle within a first wavelength range; in that a second sensor unit or sensor section is adapted to sense the sub-energy content of the same particle and/or its wavelength intensity within a second wavelength range; and in that the evaluating unit is adapted to allow the output signals from the sensor units or the sensor sections to be processed and in that activation of the activation unit is either inhibited or initiated on the basis of the result obtained, wherein the plurality of sensor units or sensor sections are adapted to sense the sub-energy content of a particle and/or its wavelength intensity within mutually discrete wavelength ranges, and wherein the evaluating unit is adapted to allow the sub-intensity of a received output signal to be compared with a stored maximized wavelength-range-related value and to allow actuation of the activation unit at least when the sub-intensity of an output signal exceeds said maximized value.

2. A detector arrangement according to claim 1, wherein a plurality of sensor units or sensor sections are adapted to sense the sub-energy content of a particle and/or its wavelength intensity within mutually overlapping wavelength ranges.

3. A detector arrangement according to claim 1, wherein the evaluating unit is adapted to allow the sub-intensities of a plurality of received output signals to be compared with a plurality of stored maximized wavelength-range related values and to actuate said activation unit in the event of a predetermined number of output signals whose respective sub-intensities exceed said maximized value.

4. A detector arrangement according to claim 1, wherein each of said wavelength regions has a wavelength exceeding 1.0 μM.

5. A detector arrangement according to claim 4, wherein each of said wavelength ranges has a wavelength within 1.2 to 5.0 μM, such as 1.4 to 4.0 μM.

6. A detector arrangement according to claim 1, wherein the selected wavelength ranges and maximized wavelength ranges related thereto and the related sub-intensity values are adapted to one or more of the following criteria: the nature of the material in said particle, the design of the preventative, protective system, the process concerned, etc.

7. A detector arrangement according to claim 1, wherein a sensor unit is adapted for evaluation of the sub-energy content of a particle and/or its wavelength intensity within at least three wavelength ranges.

8. A detector arrangement according to claim 1, wherein a number of sensor sections within a sensor unit.

9. A detector arrangement according to claim 1, wherein each sensor unit included in a plurality of sensor units co-acts with a respective optical filter.

10. A detector arrangement according to claim 1, wherein a sensor unit co-acts with a selected number of optical filters.

11. A detector arrangement according to claim 1, wherein a sensor unit co-acts with an optical filter adapted for a plurality of wavelength ranges.

12. A detector arrangement according to claim 1, wherein the sub-energy values of a number of sensor units or sensor sections are coordinated and adapted to include solely the relevant energy content of a particle.

13. A detector arrangement adapted for use in a preventative, protective system and comprising a number of sensor units or sensor sections, a sensor-unit output signal evaluating unit, and an activation unit which co-acts with said evaluating unit, wherein at least one particle whose presence is sensed by the sensor units and that has an energy content determined by the evaluating unit that exceeds a predetermined value causes the activation unit to switch from a first state to a second state, wherein a first sensor unit or sensor section is adapted to sense the sub-energy content of a particle and/or the wavelength intensity of said particle within a first wavelength range; in that a second sensor unit or sensor section is adapted to sense the sub-energy content of the same particle and/or its wavelength intensity within a second wavelength range; and in that the evaluating unit is adapted to allow the output signals from the sensor units or the sensor sections to be processed and in that activation of the activation unit is either inhibited or initiated on the basis of the result obtained, a first unit for producing loose material and a second unit for receiving the loose material from the first unit, wherein said first unit imparts to one or more of said individual particles a temperature and/or an energy content that is sufficiently high to initiate fire and/or explosion in at least the second unit, wherein a transportation path of the loose material between said first unit and said second unit including a stabilizing zone, a high particle temperature indicating zone and an extinguishing zone, said indicating zone including a plurality of sensor units or sensor sections adapted to sense the energy content of and/or wavelength-related intensities of said particles, wherein said sensor units or sensor sections are able to co-act with a sensor-unit output signal evaluating unit and an activation unit so that when at least one of the sensor units or sensor sections generates an indication of the presence of a particle that has a high energy content there is activated an extinguishing means belonging to said extinguishing zone and/or particle removal means, and wherein the sensing lobes of at least two sensor units or sensor sections are intended to cover a cross-sectional area of the loose material transportation path, wherein said evaluating unit is adapted to sense and to evaluate each sub-intensity-dependent signal related to a narrow wavelength range from each of a number of sensor units or sensor sections, and an evaluating unit is adapted to coordinate, the thus received sub-intensity-dependent signals related to said wavelength range for calculating and establishing the relevant disposition of a chosen particle to initiate fire and/or explosion or to create some other hazard.

14. A detector arrangement according to claim 13, wherein each of said sensor units or sensor sections is allocated a narrow wavelength range and in that said units or sections are disposed diametrically or uniformly around the inner peripheral surface of a conduit of circular cross-section.

15. A detector arrangement according to claim 13, wherein said sensor units or sensor sections are disposed opposite one another about the inner perimeter surface of a tubular conduit of angular, cornered cross-sectional shape.

16. A detector arrangement according to claim 13, wherein said sensor units or sensor sections are disposed symmetrically and opposite one another about the inner perimeter surface of a tubular conduit of right-angled cross-sectional shape.

17. A detector arrangement according to claim 13, wherein each sensor unit or sensor section is allocated a detection angle of about 180 degrees.

18. A detector arrangement according to claim 13, wherein each sensor unit or sensor section is covered by a protective element that includes a plurality of mutually adjacent slots that are orientated in a direction perpendicular to, or essentially perpendicular to, the feed direction of said loose material.

19. A detector arrangement responsive to the energy content of particles flowing in a flow path for actuating ignition suppression means operative in response to an activation signal to prevent ignition of the particles in the flow path, each individual particle having a senseable energy content, comprising:

a plurality of sensor locations in the flow path, the sensing locations being selectively responsive to the energy content of the particles in a defined relatively narrow energy band for each sensor location, each sensor location for producing a sensor output corresponding to the level of energy of a particle in the flow path at the sensor location that lies within the defined energy band for the sensor location;

a evaluating unit responsive to the sensor outputs for producing an output when at least one selected sensor output exceeds a selected value;

an activation unit responsive to the output of the evaluating unit for producing the activation signal for communication to the ignition suppression means.

* * * * *